(12) United States Patent
Kumagai et al.

(10) Patent No.: US 8,959,783 B2
(45) Date of Patent: Feb. 24, 2015

(54) LASER SURVEYING SYSTEM

(75) Inventors: Kaoru Kumagai, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 206 days.

(21) Appl. No.: 13/818,998

(22) PCT Filed: Sep. 12, 2011

(86) PCT No.: PCT/JP2011/071176
§ 371 (c)(1),
(2), (4) Date: Feb. 26, 2013

(87) PCT Pub. No.: WO2012/036254
PCT Pub. Date: Mar. 22, 2012

(65) Prior Publication Data
US 2013/0152412 A1 Jun. 20, 2013

(30) Foreign Application Priority Data
Sep. 14, 2010 (JP) ................................ 2010-205857

(51) Int. Cl.
*G01C 15/00* (2006.01)
(52) U.S. Cl.
CPC .............. *G01C 15/004* (2013.01); *Y10S 33/21* (2013.01)
USPC ............................ 33/291; 33/228; 33/DIG. 21
(58) Field of Classification Search
USPC ............................ 33/291, 293, 228, DIG. 21
See application file for complete search history.

(56) References Cited

U.S. PATENT DOCUMENTS 5,991,102 A * 11/1999 Oono et al. .................... 359/820
6,104,479 A * 8/2000 Ohtomo et al. ............... 356/143

(Continued)

FOREIGN PATENT DOCUMENTS

JP          2004-144681 A      5/2004

*Primary Examiner* — Yaritza Guadalupe-McCall
(74) *Attorney, Agent, or Firm* — Nields, Lemack & Frame, LLC

(57) ABSTRACT

A laser surveying system comprises a leveling unit (3) having a motor for leveling, a light source unit (14) for emitting a laser beam, a light projecting optical system installed on the leveling unit and for projecting the laser beam, a power supply unit for supplying electric power to each of component sites, a control unit (7) for driving and controlling each of the component sites, a storage unit (26), a tilt detecting means (11) installed on the leveling unit and used for detecting leveling conditions, a rotation number detecting means (13) for detecting number of rotations of the motor, a light source detecting means (16a and 16b) for detecting light emitting condition of the light source unit, a voltage detecting means (24) for detecting output voltage of the power source unit, and an abnormality detecting means for detecting operational abnormality, and in the laser surveying system, the control unit monitors whether there is abnormality or not by the abnormality detecting means, samples a detection signal from each of the detecting means at a predetermined time interval, and stores signal groups thus detected in the storage unit in time series as sampling data, and when the stored sampling data exceeds a predetermined amount, older data are deleted, and new sampling data are sequentially overwritten, and when at least one of the detection signals for monitoring indicates abnormality, using a point to indicate the abnormality as a base point, the sampling data in a range of a predetermined time period are exempted from the objects of deletion and are preserved as data for analysis of the cause of abnormality.

15 Claims, 3 Drawing Sheets

(56) References Cited

U.S. PATENT DOCUMENTS

| | | | |
|---|---|---|---|
| 6,160,616 A * | 12/2000 | Ohtomo et al. | 356/247 |
| 6,671,058 B1 * | 12/2003 | Braunecker et al. | 356/616 |
| 6,688,011 B2 * | 2/2004 | Gamal et al. | 33/290 |
| 7,433,028 B2 * | 10/2008 | Kumagai et al. | 356/139.03 |
| 7,884,923 B2 * | 2/2011 | Kumagai et al. | 356/4.01 |
| 7,966,739 B2 * | 6/2011 | Kamizono et al. | 33/290 |
| 2007/0103672 A1 * | 5/2007 | Kumagai et al. | 356/139.03 |
| 2009/0106989 A1 * | 4/2009 | Kamizono et al. | 33/285 |
| 2010/0091263 A1 * | 4/2010 | Kumagai et al. | 356/4.01 |
| 2013/0152412 A1 * | 6/2013 | Kumagai et al. | 33/291 |
| 2014/0202011 A1 * | 7/2014 | Munroe et al. | 33/228 |

\* cited by examiner

LASER SURVEYING SYSTEM

TECHNICAL FIELD

The present invention relates to a laser surveying system for forming a reference plane and a reference line in case where ground surface is leveled in horizontal direction, inclination gradient is set, or gradient is set for laying an earthen pipe.

BACKGROUND ART

A laser surveying system to be applied in civil engineering work, construction work, etc. is used and operated in a wide range of area, for instance, the laser surveying system is used in outdoor condition or in indoor condition or used in cold climate region or in high temperature and high humidity region. Further, when the surveying system may be dropped off during operation or when the system may be collided or may fall off during operation and use, and a high shock may be acted on the laser surveying system.

There are various causes of troubles when the laser surveying system is not operated in normal condition. These causes include, for instance: a case of abnormality or trouble in the laser surveying system itself, or a case of temporal operational abnormality due to sudden change in the condition to use, a case where the laser surveying system is not adequately installed, or a case where the laser surveying system is not used under such condition that the surveying system is operated in normal condition (e.g. when the laser surveying system is installed at a place where vibration or shaking occurs). Further, even when it is caused from the abnormality or the trouble of the laser surveying system itself, there may be a case of deterioration over time of the parts, which constitute the laser surveying system, or a case of a strong shock from outside such as falling-off, or a case of thermal deterioration by use under high temperature conditions.

In the past, when operational abnormality occurs on the laser surveying system, the cause of the operational abnormality is investigated at an operational field office, and when the cause is not identified at the operational field office, the laser surveying system in question is normally sent to a service station. Then, the cause of the operational abnormality is investigated at the service station. If the cause cannot be identified at the service station, the laser surveying system is further transported to a technical branch of a manufacturing factory and the cause is investigated and proper measures are taken to correct the operational abnormality.

Therefore, when the cause of the operational abnormality is clarified in initial stage such as the investigation at the operational field office, the abnormality can be corrected with high efficiency. However, when the cause of the trouble is investigated at the technical branch of the manufacturing factory, the laser surveying system must be transported each time, and the cause of the trouble must be investigated each time. Accordingly, much time and days are required. Further, because the cause of the trouble must be investigated each time at each branch and high skill and training are required for each of the operators, much time and cost are involved.

To solve the problems as described above, it is an object of the present invention to provide a laser surveying system so that the cause of the operational abnormality can be identified in simple manner.

PRIOR ART REFERENCE

[Patent Document 1] Patent Publication JP-A-2004-144681

DISCLOSURE OF THE INVENTION

The present invention relates to a laser surveying system, comprising a leveling unit having a motor for leveling, a light source unit for emitting a laser beam, a light projecting optical system installed on the leveling unit and for projecting the laser beam, a power supply unit for supplying electric power to each of component sites, a control unit for driving and controlling each of the component sites, a storage unit, a tilt detecting means installed on the leveling unit and used for detecting leveling conditions, a rotation number detecting means for detecting number of rotations of the motor, a light source detecting means for detecting light emitting condition of the light source unit, a voltage detecting means for detecting output voltage of the power source unit, and an abnormality detecting means for detecting operational abnormality, wherein the control unit monitors whether there is abnormality or not by the abnormality detecting means, samples a detection signal from each of the detecting means at a predetermined time interval, and stores signal groups thus detected in the storage unit in time series as sampling data, and when the stored sampling data exceeds a predetermined amount, older data are deleted, and new sampling data are sequentially overwritten, and when at least one of the detection signals for monitoring indicates abnormality, using a point to indicate the abnormality as a base point, the sampling data in a range of a predetermined time period are exempted from the objects of deletion and are preserved as data for analysis of the cause of abnormality.

Further, the invention relates to the laser surveying system as described above, wherein the abnormality detecting means monitors whether there is abnormality or not according to the detection signal from each of the detecting means. Further, the invention relates to the laser surveying system as described above, wherein the abnormality detecting means monitors whether there is abnormality or not based on a signal from a wireless communication unit which performs communication to and from an external device.

Further, the invention relates to a laser surveying system as described above, wherein the external device is a light receiving device.

Further, the invention relates to the laser surveying system as described above, wherein the range of the predetermined time period as the base point is a range to go back from the base point in terms of time, and is a range by regarding the base point as a starting point in terms of time. Further, the invention relates to the laser surveying system as described above, wherein the range of the predetermined time period as the base point is a range to go back or go forward in terms of time before and after the base point.

Further, the invention relates to the laser surveying system as described above, wherein the control unit has a diagnostic program, and the control unit identifies a cause of abnormality from data for analysis of the cause of the abnormality.

Further, the invention relates to the laser surveying system as described above, further comprising a PC, wherein the PC has a diagnostic program, and the PC identifies the cause of abnormality from the data for analysis of the cause of the abnormality.

Further, the invention relates to the laser surveying system as described above, wherein the diagnostic program associates the cause of abnormality with the site of the structural component. Further, the invention relates to the laser surveying system as described above, wherein each of the components is designed as an assembly, and the component related to the cause of abnormality can be exchanged.

Further, the invention relates to the laser surveying system as described above, further comprising a temperature detecting means and/or a humidity detecting means, wherein a detection signal as detected by the temperature detecting means and/or the humidity detecting means is added to the sampling data. Further, the invention relates to the laser surveying system as described above, further comprising an acceleration detecting means, wherein the acceleration detecting means detects vibration, shock and tilting acted on a rotary laser irradiation system, and a detecting signal of the acceleration detecting means is added to the sampling data. Further, the invention relates to the laser surveying system as described above, further comprising an illumination detecting means, wherein a detection signal of the illumination detecting means is added to the sampling data. Further, the invention relates to the laser surveying system as described above, further comprising a GPS system, wherein positional information detected by the GPS system is added to the sampling data.

Furthermore, the invention relates to the laser surveying system as described above, further comprising a deflecting optical member for deflecting the laser beam at an angle of 90° and a rotary driving unit for rotating the deflecting optical member, wherein the laser beam is projected in rotary irradiation.

LEGEND OF REFERENCE NUMERALS

Figure 1:
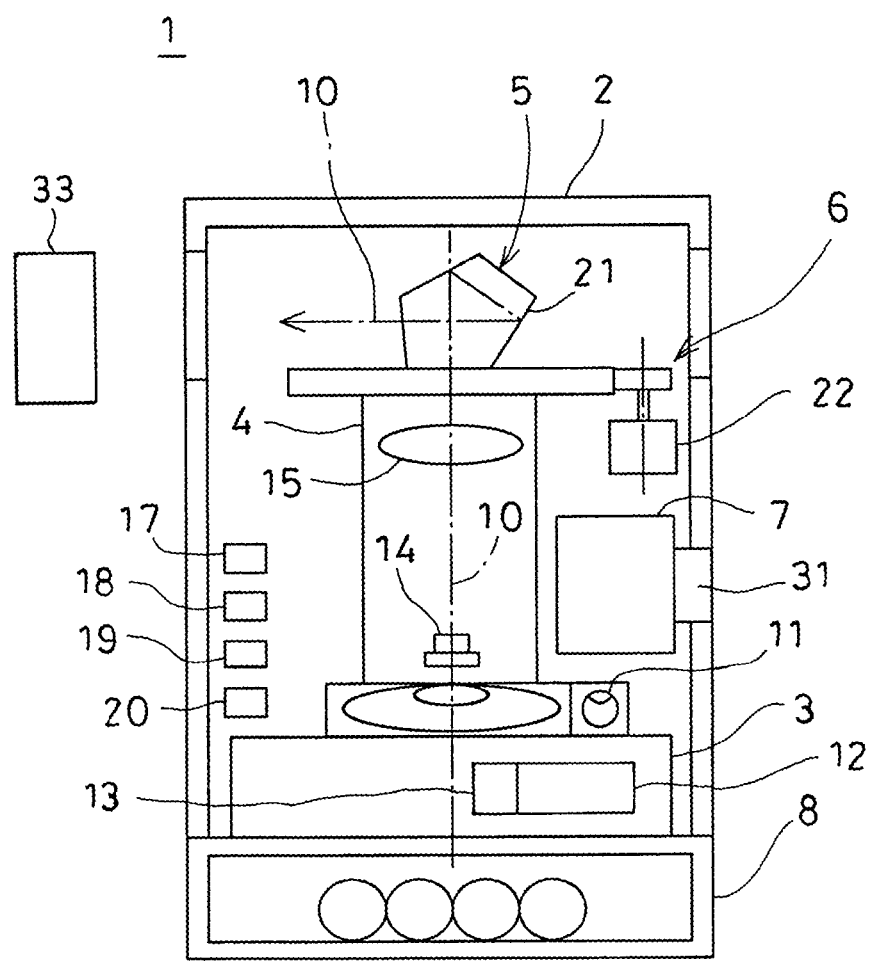
FIG. 1 is a schematical cross-sectional view to show a rotary laser irradiation system, to which the present invention is applied.

1 Rotary laser irradiation system
2 Housing
3 Leveling unit
4 Light projecting optical system
5 Rotary irradiation unit
6 Rotary driving unit
7 Control unit
8 Power supply unit
10 Laser beam
11 Tilt sensor
12 Leveling motor
13 Rotation number detecting means
14 Light source unit
16 Light source monitor
17 Thermometer
18 Hygrometer
19 Accelerometer
20 Illuminometer
23 Encoder
24 Voltage detecting means
25 Arithmetic unit
26 Storage unit
26a Program storage region
26b Operation record storage region
30 Communication unit
33 Light receiving device

BEST MODE FOR CARRYING OUT THE INVENTION

Description will be given below on an embodiment of the present invention by referring to the attached drawings.

First, referring to FIG. 1 and FIG. 2, description will be given on a laser surveying system, to which the present invention is applied. In FIG. 1, a rotary laser irradiation system 1 is shown as an example of the laser surveying system.

Within a closed housing 2, there are provided a leveling unit 3, a light projecting optical system 4 disposed on the leveling unit 3, a rotary irradiation unit 5 rotatably mounted around an optical axis of the light projecting optical system 4, a rotary driving unit 6 for rotating the rotary irradiation unit 5, and a control unit 7 for controlling the leveling unit 3, the light projecting optical system 4, the rotary irradiation unit 5 and the rotary driving unit 6. On a bottom surface of the housing 2, a power supply unit 8 is provided, and electric power is supplied to the leveling unit 3, to the light projecting optical system 4, and to the rotary irradiation unit 5 from the power supply unit 8. At positions as required of the housing 2, for instance, at a side of the housing 2, there are provided an operation unit 28, a display unit 29, and an external communication connector 31. Further, inside the housing 2, there is provided a communication unit 30, which can perform wireless communication to and from an external device 33. As the external device 33, a light receiving device, a remote controller, etc. may be used.

The rotary laser irradiation system 1 can be connected to an external computer (PC) 32 via the external communication connector 31, and the rotary laser irradiation system 1 and the external computer 32 can send and receive data to and from each other via the external communication connector 31.

The leveling unit 3 comprises a tilt sensor 11, which is a pair of tilt detecting means disposed to perpendicularly cross each other in two horizontal directions, a stage (not shown) tiltable along two axes, a leveling motor 12 provided with respect to each axis and used for tilting the stage independently in directions of the two axes, a rotation number detecting means 13 for detecting number of rotations of the leveling motor 12, e.g. an encoder. Detection result of the tilt sensor 11 is inputted to the control unit 7, and the control unit 7 drives the leveling motor 12 based on the detection result from the tilt sensor 11, controls leveling operation, and monitors consistency of operation of the leveling motor 12 with the tilt detection result of the tilt sensor 11 based on a detection result from the rotation number detecting means 13 and on the detection result from the tilt sensor 11.

For the tilt sensor 11, in addition to angle sensors, perpendicularly crossing each other in two horizontal directions, an angle sensor in vertical direction may be provided. In this case, by falling down the rotary laser irradiation system 1, a vertical reference plane can be formed. The rotation number detecting means 13 may be an encoder connected to the leveling motor 12. Or, in case the leveling motor 12 may be a pulse motor, the rotation number detecting means 13 may be driving means for emitting driving pulses to the leveling motor 12 or the rotation number detecting means 13 may be a counter to count the driving pulses.

The light projecting optical system 4 comprises a light source unit 14 such as an LD for emitting a laser beam 10, an optical member 15 including a collimating lens or the like, which collimates the laser beam 10 as parallel luminous fluxes, and a light source monitor 16 (see FIG. 2) as a light source detecting means for monitoring light emitting condition of the light source unit 14. The light source monitor 16 comprises an optical sensor (light detecting means) 16a for detecting light emitting conditions by monitoring the projected laser beams 10 and an electric current detector (electric current detecting means) 16b for detecting light emitting conditions by monitoring the electric current applied on the light source unit 14. The control unit 7 controls light emitting conditions of the light source unit 14 based on detection results of at least one of either the optical sensor 16a or the electric current detector 16b. The control unit 7 compares the detection result by the optical sensor 16a with the detection result by the electric current detector 16b and judges consistency of the detection result from the optical sensor 16a with the detection result from the electric current detector 16b.

On inner side and on outer side respectively, or at least on one of the inner side and the outer side of the housing 2, there are provided a thermometer 17, which is a temperature detecting means, and a hygrometer 18, which is a humidity detecting means. By the thermometer 17 and the hygrometer 18, temperature and humidity are measured under using the rotary laser irradiation system 1, and the temperature and the humidity thus detected are inputted to the control unit 7. Inside the housing 2, an accelerometer 19, which is an acceleration detection means, is provided so that a value of impact acted on the rotary laser irradiation system 1 is detected, and the result of the detection of the accelerometer 19 is outputted to the control unit 7. An illuminometer 20, which is an illumination detecting means, is provided inside the housing 2. By this illuminometer 20, brightness (luminosity) inside the housing 2 is detected as external light passes through the housing 2, and detection result of the illuminometer 20 is inputted to the control unit 7.

The rotary irradiation unit 5 has a deflecting optical member 21 such as a pentagonal prism, which is rotatably supported. When the deflecting optical member 21 is rotated by the rotary driving unit 6, the deflecting optical member 21 deflects the laser beam 10 projected from the light projecting optical system 4 in horizontal direction, and further, projects the laser beam in rotary irradiation, and forms a horizontal reference plane and a tilted reference plane.

The rotary driving unit 6 comprises a scanning motor 22 for rotating the rotary irradiation unit 5 and a rotation number detecting means (e.g. an encoder) 23, and the encoder 23 detects number of rotations and rotating speed of each of the rotary irradiation unit 5 and the scanning motor 22. The number of rotations and rotating speed as detected by the encoder 23 are inputted to the control unit 7, and the control unit 7 controls the scanning motor 22 at a predetermined constant speed based on the detection result of the encoder 23.

The power supply unit 8 has a voltage detecting means 24 such as a voltage detecting meter, and output voltage is constantly detected by the voltage detecting means 24. The detection result by the voltage detecting means 24 is inputted to the control unit 7, and the control unit 7 judges abnormality such as condition of consumption of the power supply unit 8 based on this detection result.

Figure 2:
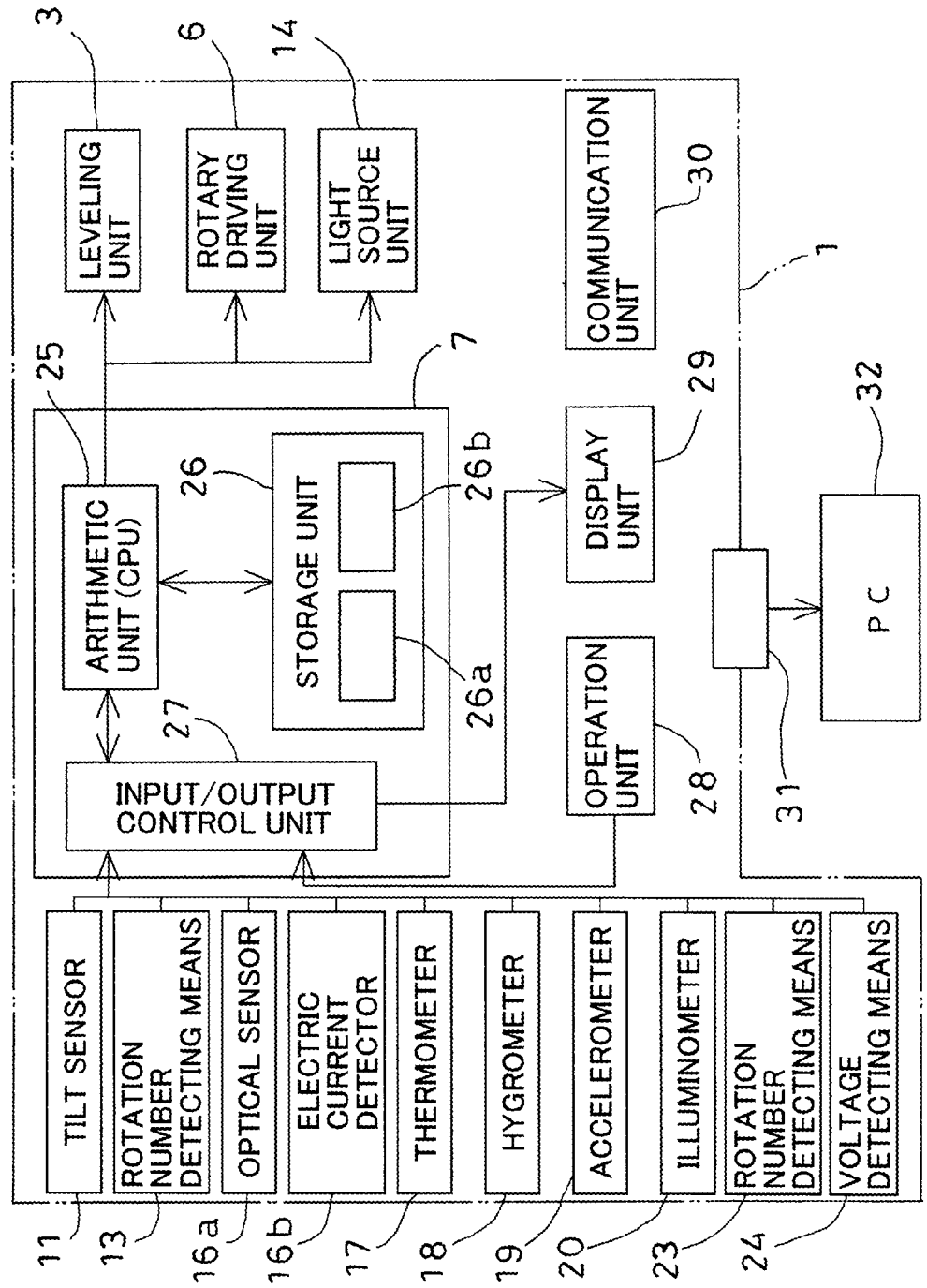
FIG. 2 is a schematical block diagram to show the rotary laser irradiation system.

As shown in FIG. 2, the control unit 7 has an arithmetic unit 25 typically represented by CPU, a storage unit 26 provided in association with the arithmetic unit 25, and an input/output control unit 27. Control signals to the leveling unit 3, to the rotary driving unit 6, and to the light source unit 14 are outputted via the input/output control unit 27, and various types of signals from the tilt sensor 11, the rotation number detecting means 13, the light source monitor 16, the thermometer 17, the hygrometer 18, the accelerometer 19, the illuminometer 20, the encoder 23, and the voltage detecting means 24 are inputted to the control unit 7 via the input/output control unit 27. The storage unit 26 may be provided separately from the control unit 7.

The storage unit 26 may be a semiconductor memory packaged on a print circuit board together with CPU, or may be a recording medium removably attached such as a memory card. The storage unit 26 has a program storage region 26a for storing programs, and an operation record storage region 26b for storing various types of data. When a memory card or the like is attached, it is preferable that various types of programs are stored on a semiconductor memory, and that operation recording data as to be described later are stored on the memory card or the like.

In the program storage region 26a of the storage unit 26, various types of programs are stored. These programs include: a sequence program for operating the rotary laser irradiation system 1, a data processing program for carrying out processing such as sampling or the like on data from various types of sensors, a diagnostic program for judging whether there is abnormality or not or for judging causes of the abnormality and for identifying an abnormal point based on the data from various types of sensors, and other types of programs. In the operational record storage region 26b, signals from the tilt sensor 11, the rotation number detecting means 13, the light source monitor 16, the thermometer 17, the hygrometer 18, the accelerometer 19, the illuminometer 20, the encoder 23, and the voltage detecting means 24 are stored in time series.

The arithmetic unit 25 drives and controls the rotary laser irradiation system 1 according to the sequence program.

While the rotary laser irradiation system 1 is operating, according to the data processing program, the arithmetic unit 25 performs sampling of signals from the tilt sensor 11, the rotation number detecting means 13, the light source monitor 16, the thermometer 17, the hygrometer 18, the accelerometer 19, the illuminometer 20, the encoder 23, and the voltage detecting means 24 and stores the data thus sampled in time series in the operation record storage region 26b as operation recording data.

The leveling unit 3, the light projecting optical system 4, the rotary irradiation unit 5, the rotary driving unit 6, the control unit 7, the power supply unit 8, and further, each of various types of sensors are designed as an assembly respectively and can be exchanged with each other.

In addition to the sensors as described above, a GPS system (not shown) for detecting a position of the rotary laser irradiation system 1 may be provided. The GPS system can measure a position in global coordinate system with accuracy of several millimeters and can detect positional changes over time of the rotary laser irradiation system 1 after the rotary laser irradiation system 1 is installed.

Next, description will be given on operation of the rotary laser irradiation system 1.

When an instruction to start the measurement is inputted via the operation unit 28, the arithmetic unit 25 drives the leveling unit 3 according to the sequence program, performs the leveling of the rotary laser irradiation system 1, further, the arithmetic unit 25 drives and controls the light projecting optical system 4 and the rotary driving unit 6, and makes the rotary laser irradiation system 1 project the laser beam 10. The laser beam 10 is turned to parallel luminous fluxes by the optical member 15 and is deflected in horizontal direction by the deflecting optical member 21. By the rotation of the deflecting optical member 21, the luminous fluxes are projected in rotary irradiation. By the rotary projection of the laser beam 10, a laser reference plane is formed.

The laser reference plane thus formed can be detected by a light receiving device 33, which is an external device. The light receiving device 33 is portable and incorporates a battery and a communication unit (not shown). The light receiving device 33 can perform wireless communication between the light receiving device 33 and the rotary laser irradiation system 1 via the communication unit and the external communication connector 31 and can transmit and receive photodetecting position on the light receiving device 33 or surveying data. As communication mode, optical communication, electric wave communication, etc. are adopted as adequate.

Further, while the rotary laser irradiation system 1 is operating, according to the data processing program, the arithmetic unit 25 stores signals as operation recording data from the tilt sensor 11, the rotation number detecting means 13, the light source monitor 16, the thermometer 17, the hygrometer 18, the accelerometer 19, the illuminometer 20, the encoder 23, and the voltage detecting means 24 in time series in the storage unit 26.

According to the diagnostic program, the arithmetic unit 25 individually monitors signals from the tilt sensor 11, the rotation number detecting means 13, the light source monitor 16, the thermometer 17, the hygrometer 18, the accelerometer 19, the illuminometer 20, the encoder 23, and the voltage detecting means 24. The arithmetic unit 25 also monitors as to whether there is sudden change or not, or whether there is a change or not to exceed tolerance with respect to a predetermined value. Further, in case an abnormality is found, analysis is made on the data, which shows the abnormality, and on the operation recording data before and after the occurrence of the abnormality according to the diagnostic program. The cause of the abnormality is identified, and further, the abnormal point is identified. Then, the result of diagnosis is displayed on the display unit 29.

Next, description will be given on a method for sampling of operation recording data and a method for storing of operation recording data by referring to FIG. 3.

Figure 3:
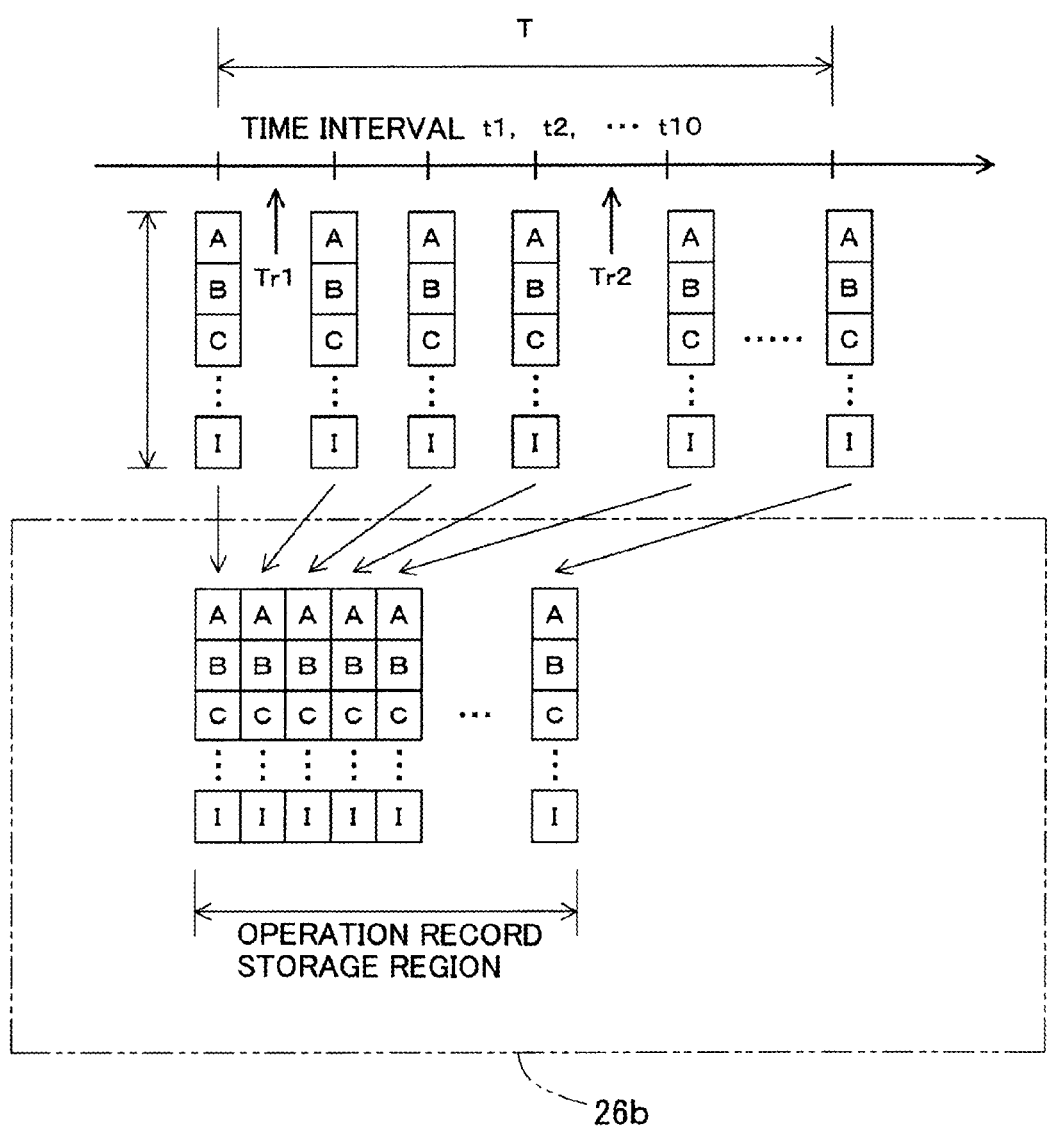
FIG. 3 is a drawing to explain conditions to acquire sampling data and to store the data in a storage unit.

In FIG. 3, each of symbols A to I represents a signal detected by the above-mentioned sensors. For instance, the symbol A represents a detection signal of the tilt sensor 11, the symbol B represents a detection signal of the rotation number detecting means 13, the symbol C represents a detection signal of the optical sensor 16a, the symbol D represents a detection signal of the electric current detector 16b, the symbol E represents a detection signal of the thermometer 17 or of the hygrometer 18, the symbol F represents a detection signal of the accelerometer 19, the symbol G represents a detection signal of the illuminometer 20, the symbol H represents a detection signal of the encoder 23, and the symbol I represents a signal of the voltage detecting means 24.

During the operation of the rotary laser irradiation system 1, each of the signals (A to I) from the tilt sensor 11, the rotation number detecting means 13, the optical sensor 16a, the electric current detector 16b, the thermometer 17, the hygrometer 18, the accelerometer 19, the illuminometer 20, the encoder 23, and the voltage detecting means 24 are sampled respectively each at a predetermined time interval, e.g. each at time interval of one second, and signal groups thus sampled are stored in the operation record storage region 26b in time series as sampling data. In case the sampling data stored in the operation record storage region 26b exceeds capacity of the operation record storage region 26b, the data older in term of time are to be deleted or data is overwritten from the older data, and the sampling data are updated.

The data suitable for the sampling include: the data where detection signals are continuously acquired for a predetermined time period ($\Delta t$), for instance, a detection signal from each of the tilt sensor 11, the rotation number detecting means 13, the accelerometer 19, and the encoder 23, or a single detection signal such as the signal from each of the optical sensor 16a, the electric current detector 16b, the thermometer 17, the hygrometer 18, the illuminometer 20, and the voltage detecting means 24. Further, in addition to the sampling data as described above, signals or the like to be inputted irregularly from the operation unit 28 are included as the operation recording data.

In the storage unit 26, reference values and/or threshold values are set and inputted in advance to judge the abnormality for each detection signal. The threshold values are threshold values about a rate of change with respect to the sampling data and/or the detection signal immediately before. Or, the threshold values are threshold values about an amount of change with respect to the sampling data and/or the detection signal immediately before. Based on the reference values and/or threshold values, the arithmetic unit 25 monitors each of the detection signals and judges whether each of these detection signals is normal or abnormal.

When the arithmetic unit 25 judges that there is an abnormality in at least one of the detection signals under monitoring or detects abnormal operation, the judgment of abnormality or operational abnormality is used as a trigger (Tr), and also, using the time point when the abnormality was judged as a base point, a sample data group (S1) up to the time point gone back a predetermined time (t1) is left untouched without deleting. That is, even when there is no more storage capacity in the operation record storage region 26b, the data are exempted from the object for erasing, and the data are preserved without deleting or overwriting. Therefore, except the sampling data group as given above, the data to be deleted are recorded as old data.

The sampling data group to be preserved may be regarded as a sampling data group (S2) for a predetermined time period before and after a time point when the abnormality was found. Or, by regarding the time point when the abnormality was found as a starting point, a sampling data group (S3) for a predetermined time period (t3) after the starting point may be preserved.

The case where the operational abnormality as described above is found includes a case of abnormality in a wireless communication within the system or operational abnormality of an external device. The abnormality of wireless communication includes a case where wireless communication cannot be received (or there is no communication, which should be performed), or a case where a noise higher than a standard value is present or there is the abnormality in the wireless communication unit itself is present. Also, the cases of the operational abnormality of the external device include: the abnormality of signal during warming-up of the external device, insufficient remaining of battery, or error signal of the external device. The operational abnormality of the external device can be transmitted to the rotary laser irradiation system 1 by wireless communication or by other means, and can be used as a trigger (Tr).

The tilt sensor 11, the rotation number detecting means 13, the optical sensor 16a, the electric current detector 16b, the thermometer 17, the hygrometer 18, the accelerometer 19, the illuminometer 20, the encoder 23, the voltage detecting means 24 or the communication unit 30 or the like, and the diagnostic program as described above fulfill the functions as abnormality detecting means. The arithmetic unit 25 detects operational abnormality of the rotary laser irradiation system 1 or the light receiving device 33 by the abnormality detecting means.

When operational defect occurs in the rotary laser irradiation system 1 or the rotary laser irradiation system 1 is not operated, an operator starts the diagnostic program by operation from the operation unit 28, or the arithmetic unit 25 starts the diagnostic program automatically and the analysis is carried out on the sampling data stored in the operation record storage region 26*b*. The analysis of the sampling data may be periodically executed in case the rotary laser irradiation system 1 falls in operational defects or in case the rotary laser irradiation system 1 cannot be operated.

Or, it may be so designed that the diagnostic program is stored in the external computer 32, and the sampling data are transmitted to the external computer 32 via the external communication connector 31, and that the sampling data may be analyzed by the external computer 32.

In case the sampling data are stored in a storage medium such as a memory card, the storage medium is taken out of the rotary laser irradiation system 1 and the storage medium is loaded in the external computer 32. Then, the sampling data may be analyzed by the external computer 32.

By analyzing the sampling data, diagnosis may be made on the cause of operational defect or non-operation is diagnosed, and the defective point is identified based on the result of diagnosis. Because the defective point is identified, there is no need any more to investigate the point of abnormality or the point of trouble when a repair is performed. Therefore, it is possible to shorten the time required for operation, to perform repair at an adequate branch according to the details of the trouble, and to perform the repair with higher efficiency and within short time.

Further, in case of operational defect or non-operation are not caused by the rotary laser irradiation system 1 itself but are caused by the condition of use, for instance, a change of environment, or in case the rotary laser irradiation system 1 is not adequately installed, the problem can be solved by the analysis of the sampling data. Therefore, unnecessary repair can be eliminated and the cost for maintenance can be reduced.

Because each of the components of the rotary laser irradiation system 1 is designed as an assembly, the repair can be carried out in simple manner by identifying or exchanging the defective assembly or the assembly in trouble. As a result, no skillfulness is required for identifying the cause of abnormality and for the repair.

Next, description will be given on an example of analysis of the sampling data according to the diagnostic program.

The result detected by the tilt sensor 11 is compared with the amount of rotation of the motor detected by the rotation number detecting means 13, which is to detect the amount of rotation of the motor of the leveling unit 3. When the tilting amount as detected by the tilt sensor 11 matches well with the amount of rotation of the leveling motor 12 detected by the rotation number detecting means 13, it is normal. If these are not matched well with each other, either one of the tilt sensor 11, the leveling motor 12, or the rotation number detecting means 13 is abnormal. The optical sensor 16*a* is to detect the level of the amount of light by separating a part of the laser beam 10 as emitted from the light source unit 14. The electric current detector 16*b* is to detect a value of electric current to be supplied to the light source unit 14. Both of the optical sensor 16*a* and the electric current detector 16*b* are used to detect light emitting condition of the light source unit 14. Therefore, if the detection results by the optical sensor 16*a* and the electric current detector 16*b* match well with the predetermined relation, it is evident that the optical sensor 16*a* and the electric current detector 16*b* are operated normally. For instance, if both of the sensors 16*a* and 16*b* detect the decrease or the increase of the amount of light beyond the allowable value of the laser beam 10, the abnormality of the light source unit 14 can be detected.

Based on the detection results from the thermometer 17, the temperature at the time of sampling is detected, and also, the extent of temperature change, i.e. the change (gradient) over time of the detection results previously acquired, is detected. This is because environmental temperature or sudden change of temperature at a position where the rotary laser irradiation system 1 is used exerts high influence on operation of the rotary laser irradiation system 1.

The humidity may exert influence on the reaching distance of the laser beam 10 and may also exert influence on the detection result by the tilt sensor 11. Therefore, the humidity as detected by the hygrometer 18 may be used as basic data to judge the operational abnormality. Also, the hygrometer 18 can detect intrusion of water into the rotary laser irradiation system 1.

The accelerometer 19 detects that the rotary laser irradiation system 1 is in the state of standstill or that an external force is acted (i.e. an impact or a vibration is acted.)

The encoder 23 detects the number of rotations of the scanning motor 22 or the number of rotations and rotating speed of the deflecting optical member 21, and also detects abnormality of the scanning motor 22.

The voltage detecting means 24 detects output voltage of the power supply unit 8 and also can detect the state of consumption of power source by finding the decrease of the detected voltage. Or, the voltage detecting means 24 detects the abnormality in the power supply unit 8 by sudden decrease or increase of the detected voltage or by non-detection of the voltage.

The diagnostic program identifies the cause of abnormality and the point of trouble based on the detection result from the above-mentioned sensor group or from combination of the detection results.

For instance, when detection result of the tilt sensor 11 does not match well with the detection result by the rotation number detection means 13, either one of the tilt sensor 11, the leveling motor 12, or the rotation number detecting means 13 is abnormal. When the detection result by the thermometer 17 or the hygrometer 18 at this time point or before a predetermined time period from this time point as a base point is extremely deviated from a normal value, the tilt sensor 11 is more likely to receive the influence of temperature and humidity, and it is assumed that the tilt sensor 11 is in the state of abnormality. Or, if it can be confirmed from the detection result by the accelerometer 19 that high impact or vibration has been acted, it is assumed that deviation may have occurred on a mechanical portion including the leveling motor 12 and the rotation number detecting means 13.

When the detection result by the optical sensor 16*a* matches well with the detection result by the electric current detector 16*b*, and the detection results by both sensors 16*a* and 16*b* indicate a decrease of the amount of light, it can be estimated that deterioration has occurred in the light source unit 14. If the detection result by the optical sensor 16*a* does not match well with the detection result by the electric current detector 16*b*, it is judged that abnormality may have occurred in the detection result of either the optical sensor 16*a* or the electric current detector 16*b*. Further, if it is found from the detection result by the illuminometer 20 at this moment that strong light has been irradiated from outside to the rotary laser irradiation system 1, it is estimated that the optical sensor 16*a* may have erroneously operated.

In addition to the optical sensor 16*a*, sensors of the rotation number detecting means 13, the encoder 23, etc. use optical light as a detection medium. When the light is detected by the illuminometer 20, the entering of an external light into the rotary laser irradiation system 1 may be estimated as the cause to detect the abnormality of these sensors.

The detection result by the accelerometer 19 indicates the condition where the external force acts to the rotary laser irradiation system 1. When vibration is detected by the accelerometer 19, this means that the rotary laser irradiation system 1 is installed in vibrating condition, and that the condition of installation is not adequate.

Therefore, abnormal operation of the rotary laser irradiation system 1 occurs under the condition where vibration is constantly detected, and if no abnormality occurs in the detection results of other sensors in the operation recording data as accumulated, it can be judged that the condition of installation of the rotary laser irradiation system 1 is not adequate. Further, when the abnormality occurs, for instance, the rotary laser irradiation system 1 does not operate, and the detection data of the accelerometer 19 is analyzed, if it is found that very high impact has been acted immediately before the occurrence of the abnormality, it is estimated that the non-operation has been caused by an accident such as dropping, falling-off, etc.

If strong external light is detected by the illuminometer 20 in the operation recording data before the base point where operational abnormality has occurred and sudden increase of temperature is detected by the thermometer 17, it is found that temperature increase has been caused by direct sunlight. Then, it is estimated that the rotary laser irradiation system 1 is installed under strong direct sunlight, and operational abnormality of the rotary laser irradiation system 1 is caused by sudden environmental change.

As described above, the cause of operational abnormality can be estimated based on the detection result by each of the sensors in the operation recording data. If the cause of abnormality cannot be estimated by a single sensor, the cause of operational abnormality can be estimated through combination of the detection results by a plurality of sensors. Also, based on the detection result of a single sensor or based on the detection result by a plurality of sensors, the site of the trouble can be identified.

Further, if database is prepared where the detection result of a single sensor or combination of the detection results by a plurality of sensors are associated with operational defection actually occurred of the rotary laser irradiation system 1, or if database is prepared where the combination of the detection result of a single sensor or combination of the detection results of a plurality of sensors are associated with the site where the trouble has actually occurred, the accuracy to identify the cause of abnormality or the accuracy to identify the site of abnormality can be increased more through the analysis of the operation record data.

In addition to the identification of the cause of abnormality or the identification of the site of abnormality based on the detection result of the sensor, for instance, if the dependency of each type of the sensor on temperature and humidity is set up as coefficient in advance, and it is judged by adding the coefficient according to the temperature and the humidity during actual use of the sensors, it is possible to maintain the accuracy of the system under the changing environmental conditions.

Further, based on the detection result by the sensor, it is possible to issue an advance notice or an alarm before the abnormal operation actually occurs.

For instance, the thermometer 17, the hygrometer 18, or the illuminometer 20 detect the environmental condition where the rotary laser irradiation system 1 is used. In case sudden temperature change is detected by the thermometer 17 or in case sudden humidity increase is detected by the hygrometer 18, an alarm can be issued to notify that an abnormal operation may be likely to occur or that the operation must be stopped. This alarm can be used for analysis of the operation recording data.

By detecting the change of position of the rotary laser irradiation system 1 by using the GPS system or by analyzing the past history of the leveling of the leveling unit 3, it is possible to determine tilting of the optical axis of the laser beam 10 projected in rotary irradiation, and it is also possible to amend the optical axis and to improve the accuracy of the reference plane, which is formed by the rotary laser irradiation system 1.

As described above, in the present embodiment, it is possible to identify at which point of a structural component, designed as assembly in advance, the trouble has occurred, and also to limit a range of disassembly for repair or in the maintenance operation to the least extent. Further, an operational staff can carry out repair or maintenance even when the operational staff may not be a special staff for repair with full knowledge about the mechanical construction. Further, because the installation condition of the system or environmental data are preserved as operational records, even when a problem may arise on the accuracy during the operation when the system is in use, it is possible to verify whether the trouble has occurred in the system or not, or whether the environmental condition to use or the installation condition of the system is inadequate or not.

INDUSTRIAL APPLICABILITY

According to the present invention, a laser surveying system comprises a leveling unit having a motor for leveling, a light source unit for emitting a laser beam, a light projecting optical system installed on the leveling unit and for projecting the laser beam, a power supply unit for supplying electric power to each of component sites, a control unit for driving and controlling each of the component sites, a storage unit, a tilt detecting means installed on the leveling unit and used for detecting leveling conditions, a rotation number detecting means for detecting number of rotations of the motor, a light source detecting means for detecting light emitting condition of the light source unit, a voltage detecting means for detecting output voltage of the power source unit, and an abnormality detecting means for detecting operational abnormality, and in the laser surveying system, the control unit monitors whether there is abnormality or not by the abnormality detecting means, samples a detection signal from each of the detecting means at a predetermined time interval, and stores signal groups thus detected in the storage unit in time series as sampling data, and when the stored sampling data exceeds a predetermined amount, older data are deleted, and new sampling data are sequentially overwritten, and when at least one of the detection signals for monitoring indicates abnormality, using a point to indicate the abnormality as a base point, the sampling data in a range of a predetermined time period are exempted from the objects of deletion and are preserved as data for analysis of the cause of abnormality. As a result, it is possible to limit and save a storage capacity, to analyze and to identify the cause of abnormality based on the data for analysis of the cause of abnormality, and to identify the cause of operational abnormality of the laser surveying system in simple manner.

Further, according to the present invention, in the laser surveying system as described above, the abnormality detecting means monitors whether there is abnormality or not according to the detection signal from each of the detecting means. As a result, it is easy to identify the site where operational abnormally has occurred.

Further, according to the present invention, in the laser surveying system as described above, the abnormality detecting means monitors whether there is abnormality or not based on a signal from a wireless communication unit which performs communication to and from an external device. As a result, it is also possible to detect operational abnormality of the external device.

Further, according to the present invention, in the laser surveying system as described above, the range of the predetermined time period as the base point is a range to go back from the base point in terms of time, and is a range by regarding the base point as a starting point in terms of time.

As a result, because a part to remarkably indicate the abnormality is preserved as data for analysis of cause of the abnormality, effective data useful for analysis of the cause of the abnormality can be accumulated.

Further, according to the present invention, in the laser surveying system as described above, the range of the predetermined time period as the base point is a range to go back or go forward in terms of time before and after the base point. As a result, because a point to remarkably indicate the abnormality is preserved as data for analysis of cause of the abnormality, effective data useful for analysis of the cause of abnormality can be accumulated.

Further, according to the present invention, in the laser surveying system as described above, the control unit has a diagnostic program, and the control unit identifies a cause of abnormality from data for analysis of the cause of the abnormality. As a result, because the operator has no need to investigate the cause of the trouble individually, and because no skill is required for the investigation of the cause, the operation can be executed within short time, and the cost can be reduced.

Further, according to the present invention, the laser surveying system as described above further comprises a PC, and in the laser surveying system, the PC has a diagnostic program, and the PC identifies the cause of abnormality from the data for analysis of the cause of the abnormality. As a result, because the operator has no need to investigate the cause of the trouble individually, and because no skill is required for the investigation of the cause, the operation can be executed within short time, and the cost can be reduced. Further, because there is no need to store the diagnostic program in the laser surveying system itself, it is possible to reduce the capacity of the storage unit and to decrease the manufacturing cost.

Further, according to the present invention, in the laser surveying system as described above, the diagnostic program associates the cause of abnormality with the site of the structural component. As a result, because the cause can be identified and the point in trouble can be identified, it is possible to perform repair quickly. The time required for operation can be shortened, and the cost for repair can be reduced.

Further, according to the present invention, in the laser surveying system as described above, each of the components is designed as an assembly, and the component related to the cause of abnormality can be exchanged. As a result, the repair operation can be completed by exchanging the components of the site in trouble. Accordingly, it is possible to shorten the time for operation and no skill is required for repair, and the cost for repair can be cut down.

Further, according to the present invention, the laser surveying system as described above further comprises a temperature detecting means and/or a humidity detecting means, and in the laser surveying system, a detection signal as detected by the temperature detecting means and/or the humidity detecting means is added to the sampling data. As a result, it is possible to judge whether the abnormality is caused by the environmental condition to use or not.

Further, according to the present invention, the laser surveying system as described above further comprises an acceleration detecting means, and in the laser surveying system, the acceleration detecting means detects vibration, shock and tilting acted on a rotary laser irradiation system, and a detecting signal of the acceleration detecting means is added to the sampling data. As a result, it is possible to judge whether the abnormality is caused by external shock such as dropping, falling off, etc. or not.

Further, according to the present invention, the laser surveying system as described above further comprises an illumination detecting means, and in the laser surveying system, a detection signal of the illumination detecting means is added to the sampling data. As a result, it is possible to judge whether the abnormality is caused by the environmental condition to use or not.

Further, according to the present invention, the laser surveying system as described above further comprises a GPS system, and in the laser surveying system, positional information detected by the GPS system is added to the sampling data. As a result, it is possible to judge whether the abnormality is caused—not from the laser surveying system itself but from positional changes over time of the laser surveying system.

Furthermore, according to the present invention, the laser surveying system as described above further comprises a deflecting optical member for deflecting the laser beam at an angle of 90° and a rotary driving unit for rotating the deflecting optical member, and in the laser surveying system, the laser beam is projected in rotary irradiation. As a result, the cause of operational abnormality of the laser surveying system to form the laser reference plane can be easily identified.

| | | | |
|---|---|---|---|
| 1 | rotary laser irradiation system | | |
| 2 | housing | | |
| 3 | leveling unit | | |
| 4 | light projecting optical system | | |
| 5 | rotary irradiation unit | | |
| 6 | rotary driving unit | | |
| 7 | control unit | | |
| 8 | power supply unit | | |
| 9 | | | |
| 10 | laser beam | | |
| 11 | tilt sensor | | |
| 12 | leveling motor | | |
| 13 | rotation number detecting means | | |
| 14 | light source unit | | |
| 15 | optical member | | |
| 16 | light source monitor | 16a optical sensor | 16b electric current detector |
| 17 | thermometer | | |
| 18 | hygrometer | | |
| 19 | accelerometer | | |
| 20 | illuminometer | | |
| 21 | deflecting optical member | | |
| 22 | scanning motor | | |
| 23 | encoder | | |
| 24 | voltage detecting means | | |
| 25 | arithmetic unit | | |
| 26 | storage unit | 26a program storage region | 26b operation record storage region |
| 27 | input/output control unit | | |
| 28 | operation unit | | |

-continued

| 29 | display unit |
| 30 | communication unit |
| 31 | external communication connector |
| 32 | exteral computer |
| 33 | light receiving device |
| 34 | |
| 35 | |

The invention claimed is:

1. A laser surveying system, comprising a leveling unit having a motor for leveling, a light source unit for emitting a laser beam, a light projecting optical system installed on the leveling unit and for projecting said laser beam, a power supply unit for supplying electric power to each of component sites, a control unit for driving and controlling each of said component sites, a storage unit, a tilt detecting means installed on said leveling unit and used for detecting leveling conditions, a rotation number detecting means for detecting number of rotations of said motor, a light source detecting means for detecting light emitting condition of said light source unit, a voltage detecting means for detecting output voltage of said power source unit, and an abnormality detecting means for detecting operational abnormality, wherein said control unit monitors whether there is abnormality or not by said abnormality detecting means, samples a detection signal from each of said detecting means at a predetermined time interval, and stores signal groups thus detected in said storage unit in time series as sampling data, and when the stored sampling data exceeds a predetermined amount, older data are deleted, and new sampling data are sequentially overwritten, and when at least one of the detection signals for monitoring indicates abnormality, using a point to indicate the abnormality as a base point, the sampling data in a range of a predetermined time period are exempted from the objects of deletion and are preserved as data for analysis of the cause of abnormality.

2. A laser surveying system according to claim 1, wherein said abnormality detecting means monitors whether there is abnormality or not according to the detection signal from each of said detecting means.

3. A laser surveying system according to claim 1, wherein said abnormality detecting means monitors whether there is abnormality or not based on a signal from a wireless communication unit which performs communication to and from an external device.

4. A laser surveying system according to claim 3, wherein said external device is a light receiving device.

5. A laser surveying system according to claim 1, wherein the range of the predetermined time period as said base point is a range to go back from the base point in terms of time, and is a range by regarding said base point as a starting point in terms of time.

6. A laser surveying system according to claim 1, wherein the range of the predetermined time period as said base point is a range to go back or go forward in terms of time before and after the base point.

7. A laser surveying system according to claim 1, wherein said control unit has a diagnostic program, and said control unit identifies a cause of abnormality from data for analysis of the cause of said abnormality.

8. A laser surveying system according to claim 1, further comprising a PC, wherein said PC has a diagnostic program, and said PC identifies the cause of abnormality from the data for analysis of the cause of said abnormality.

9. A laser surveying system according to claim 7 or claim 8, wherein said diagnostic program associates the cause of abnormality with the site of said structural component.

10. A laser surveying system according to claim 9, wherein each of said components is designed as an assembly, and the component related to the cause of abnormality can be exchanged.

11. A laser surveying system according to claim 1 or claim 7 or claim 8, further comprising a temperature detecting means and/or a humidity detecting means, wherein a detection signal as detected by said temperature detecting means and/or said humidity detecting means is added to said sampling data.

12. A laser surveying system according to claim 1 or claim 7 or claim 8, further comprising an acceleration detecting means, wherein said acceleration detecting means detects vibration, shock and tilting acted on a rotary laser irradiation system, and a detecting signal of said acceleration detecting means is added to said sampling data.

13. A laser surveying system according to claim 1 or claim 7 or claim 8, further comprising an illumination detecting means, wherein a detection signal of said illumination detecting means is added to said sampling data.

14. A laser surveying system according to claim 1 or claim 7 or claim 8, further comprising a GPS system, wherein positional information detected by said GPS system is added to said sampling data.

15. A laser surveying system according to claim 1, further comprising a deflecting optical member for deflecting said laser beam at an angle of 90° and a rotary driving unit for rotating said deflecting optical member, wherein said laser beam is projected in rotary irradiation.

\* \* \* \* \*